United States Patent [19]

Utsumi et al.

[11] Patent Number: 4,965,724
[45] Date of Patent: Oct. 23, 1990

[54] COMPILER SYSTEM USING REORDERING OF MICROOPERATIONS TO ELIMINATE INTERLOCKED INSTRUCTIONS FOR PIPELINED PROCESSING OF ASSEMBLER SOURCE PROGRAM

[75] Inventors: Isao Utsumi; Yoshikazu Mori, both of Tokyo, Japan

[73] Assignee: Oki Electric Industry Co., Ltd., Tokyo, Japan

[21] Appl. No.: 162,225

[22] Filed: Feb. 29, 1988

[30] Foreign Application Priority Data

Mar. 5, 1987 [JP] Japan .................................. 62-48960
Aug. 17, 1987 [JP] Japan .................................. 62-203175

[51] Int. Cl.⁵ .......................... G06F 9/22; G06F 9/30; G06F 9/42; G06F 9/45
[52] U.S. Cl. .................................. 364/200; 364/280.1; 364/280.5; 364/946.6; 364/958.34; 364/973.0; 364/931.01
[58] Field of Search .................... 364/200, 900, 300

[56] References Cited

U.S. PATENT DOCUMENTS

| | | | |
|---|---|---|---|
| 4,398,249 | 8/1983 | Pardo et al. | 364/300 |
| 4,468,736 | 8/1984 | DeSantis et al. | 364/200 |
| 4,567,574 | 1/1986 | Saadé | 364/900 |
| 4,656,582 | 4/1987 | Chaitin et al. | 364/300 |
| 4,656,583 | 4/1987 | Auslander et al. | 364/300 |
| 4,763,255 | 8/1988 | Hopkins et al. | 364/300 |
| 4,802,091 | 1/1989 | Cocke et al. | 364/300 |

Primary Examiner—Archie E. Williams, Jr.
Assistant Examiner—Ayni Mohamed
Attorney, Agent, or Firm—Spencer & Frank

[57] ABSTRACT

A compiler system compiles a source program described with assembler instructions, each of which defines microoperations, into a target program for use in a digital signal processor. If two of the assembler instructions are interlocked with each other and if another assembler instructions which is not associated with the interlocked instructions is present, it is inserted between the interlocked instructions to thereby reorder the microoperations of the source program. Thereafter, the microoperations thus reordered are combined so as not to conflict with each other with regard to the fields of the assembler instructions and resources used by the assembler instructions. Prior to combining the microoperations, whether or not a basic block of assembler instructions included in the source program having a loop may be determined. If so, a head portion of the basic block forming the loop may then be transferred to a tail portion of the basic block forming the loop.

2 Claims, 13 Drawing Sheets

COMPILER SYSTEM USING REORDERING OF MICROOPERATIONS TO ELIMINATE INTERLOCKED INSTRUCTIONS FOR PIPELINED PROCESSING OF ASSEMBLER SOURCE PROGRAM

BACKGROUND OF THE INVENTION

1. Field of the Invention

The present invention relates to a system for and method of compiling a program, and particularly to a system for and method of compiling a source program to generate microinstructions associated with sets of instructions of the source program and optimum to a processor operative with horizontal-type instructions.

2. Description of the Prior Art

Conventionally, tools have been known for designing programs running with a microprocessor oriented to horizontal-type microinstructions. For example, "Software Techniques for Signal Processors" Computer and Application's Mook, Vol. 15, pp. 31-32, Corona Publishing Co., Ltd., Japan, Jan. 1, 1886, teaches an assembler described with mnemonic symbols assisting the human memory and adapted to formats of instructions for digital signal processors (DSPs). Assembler instructions employed for that assembler system have mnemonic symbols defining an effective part of microoperations included in a set of horizontal-type instructions. Into the remaining part, not defined, a default assembler instruction is automatically inserted. Thus a set of instructions will be completed.

Digital signal processors are usually adapted to pipeline operations. For example, four operations may be concurrently executed, the operations including loading a pair of read-out registers with data from a main memory, multiplying the contents of the pair of read-out registers, performing an arithmetic or logical operation, and storing the resultant data in the memory. In order to accomplish such concurrent operations, microinstructions are formed into a horizontal or lateral format, which includes an operation field defining an arithmetic or logical operation, and a transfer field for addressing memory locations from which data is read out and to which data is stored.

A microinstruction defining addition, for example, includes three processings: loading a pair of read-out registers with data from the memory; adding the contents of the pair of registers to provide resultant data which is stored in a write-in register; and transferring the data in the write-in register to the memory. The horizontal structure of microinstructions enables those three kinds of processings to be executed simultaneously. From the viewpoint of the data to be processed, however, it takes three steps of microinstructions which must be executed before data resulting from an addition is stored in the internal memory. Consecutive additions may be performed with successive execution of microinstructions by effectively utilizing pipeline architecture, thereby enhancing the throughput of data processing.

The pipeline processor described above may concurrently handle three streams of operations, such as additions, to efficiently utilize pipeline architecture. For that aim, according to the prior art assembler system discussed above, a single assembler instruction is required to define three microoperations, such as load, add and store, with three mnemonic instructions. Programmers are therefore required to describe a program with such a conventional instruction format with the hardware structure of a pipeline processor they use being taken into account.

For example, to perform additions the pipeline processor executes simultaneously three separate and independent kinds of operations on different data. More specifically, the processor concurrently executes reading out from a memory location a first data to be operated on in the following microinstruction step, adding a second data which was read out of the memory in the immediately preceding microinstruction step, and writing in the memory a third data resulting from the operation executed in the immediately preceding microinstruction step. The programmer has to describe a single assembler instruction defining such three independent operations. This requires much more time and work before a source program is completed with assembler instructions.

SUMMARY OF THE INVENTION

It is therefore an object of the present invention to provide a system for and method of compiling assembler instructions which is improved and which facilitates a source program to be designed.

In accordance with the present invention, a system for compiling a source program described with assembler instructions, each of which defines a plurality of microoperations, into a target program for use in a processor operative with a horizontal type of instruction defined by the microoperations, comprises: reordering means for determining whether or not two of the assembler instructions are interlocked with each other, and placing another of the assembler instructions which is not associated with the interlocked assembler instructions between the interlocked assembler instructions, if any, to thereby reorder the microoperations of said source program; and combining means for combining the microoperations reordered by said reordering means so as not to conflict with each other with regard to the fields of the assembler instructions and resources used by the assembler instructions.

Further, in accordance with the invention, a system for compiling a source program described with assembler instructions, each of which defines a plurality of microoperations, into a target program for use in a processor operative with a horizontal type of instruction defined by the microoperations, comprises: transferring means for determining whether or not a basic block of assembler instructions included in said source program forms a loop, and transferring either of head and tail portions of the basic block forming the loop, if any, to the other of the head and tail portions of the basic block forming the loop; and combining means for combining the microoperations obtained by said transferring means so as to avoid conflict between the transferred portion and the other portion of the basic block.

Also in accordance with the invention, a method of compiling a source program described with assembler instructions, each of which defines a plurality of microoperations, into a target program for use in a processor operative with a horizontal type of instruction defined by the microoperations, comprises the steps of: reordering microoperations of said source program by determining whether or not two of the assembler instructions are interlocked with each other, and placing another of the assembler instructions which is not associated with the interlocked assembler instructions between the interlocked assembler instructions, if any; and combining the microoperations reordered in said reordering step so as not to conflict with each other with regard to the fields of the assembler instructions and resources used by the assembler instructions.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENTS

Figure 1:
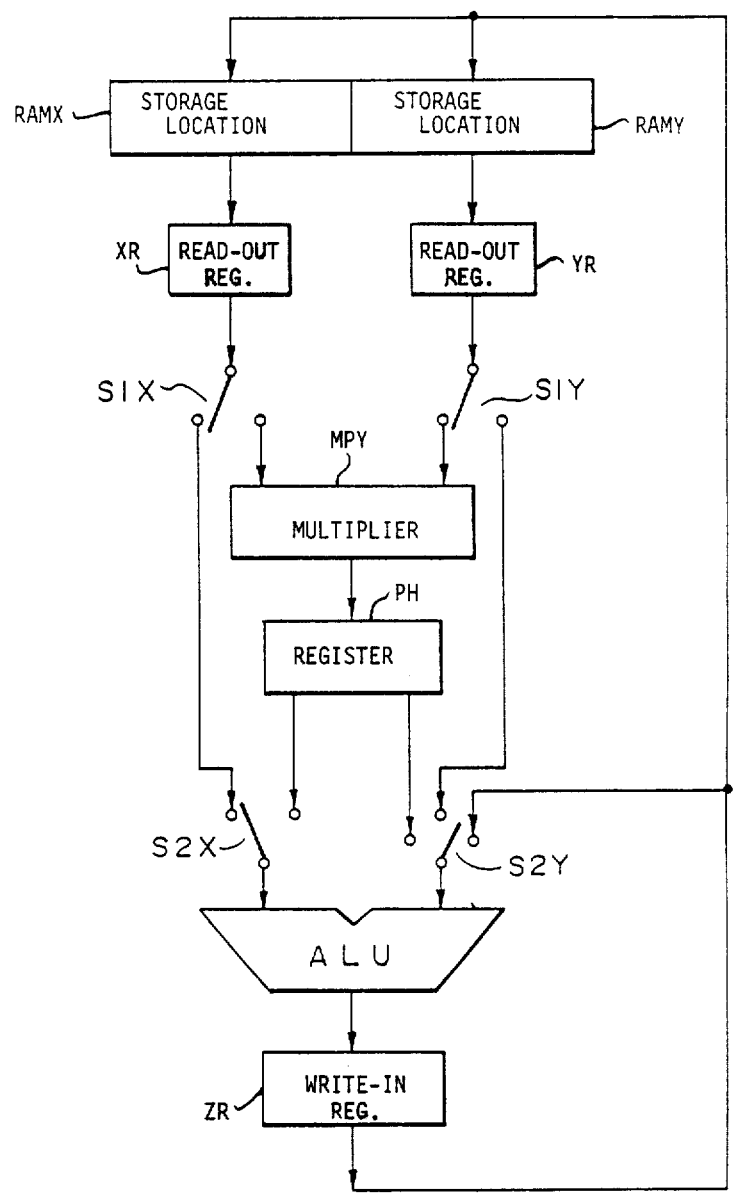
FIG. 1 is a schematic block diagram showing an example of a digital signal processor to which the present invention is applicable.

Referring to FIG. 1, an exemplified pipeline processor, which is advantageously adapted for a digital signal processor (DSP), includes an internal or main memory having storage locations RAMX and RAMY. Data stored in locations RAMX and RAMY may be read out therefrom to read-out registers XR and YR, respectively. The contents of read-out registers XR and YR may be transferred through selector switches S1X, S2X, and S1Y, S2Y, respectively, to an arithmetic and logical unit ALU, or the contents of registers XR and YR may be transferred through selector swithces S1X and S1Y to a multiplier MPY. Arithmetic and logical unit ALU performs an arithmetic or logical operation on data entered from registers XR and YR, or from a register ZR, and the result of the operation is stored in write-in register ZR. Multiplier MPY multiplies data from read-out registers XR and YR and the result is stored in a register PH. The contents of register PH are transferred through selectors S2X and S2Y to arithmetic and logical unit ALU.

The digital signal processor advantageously executes four operations concurrently, which include reading out storage locations RAMX and RAMY, using multiplier MPY to multiply the contents of read-out registers XR and YR, performing an arithmetic or logical operation such as addition or subtraction in arithmetic and logical unit ALU, and storing resultant data in the main memory.

Figure 2:
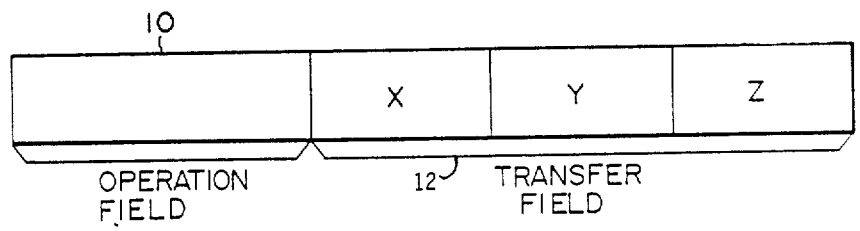
FIG. 2 shows an example of the format of a horizontal type of instruction set which can be advantageously applied to the digital signal processor shown in FIG. 1.

In order to accomplish such concurrent operations, the digital signal processor is adapted to be operative in response to microinstructions which are formed in a horizontal or lateral instruction format, which includes an operation field 10 (see FIG. 2) for defining an arithmetic or logical operation, such as addition or subtraction, in arithmetic and logical unit ALU, and a transfer field 12 for addressing memory locations X and Y from which data is read out as well as memory location Z to which data is stored in the main memory.

A microinstruction defining addition, for example, may include three processings: loading read-out registers XR and YR with data from memory locations RAMX and RAMY, respectively; adding the contents of registers RAMX and RAMY in arithmetic and logical unit ALU to provide resultant data which is stored in write-in register ZR; and transferring the data in write-in register ZR to the memory location RAMX or RAMY. Those three kinds of processings are executed simultaneously by the horizontally structured microinstructions. More specifically, three steps of microinstructions are executed since the data stored in internal memory locations RAMX and RAMY are read out to arithmetic and logical unit ALU, addition is performed on that data, and the data resultant from the addition is stored in the internal memory location RAMX or RAMY.

Figure 3:
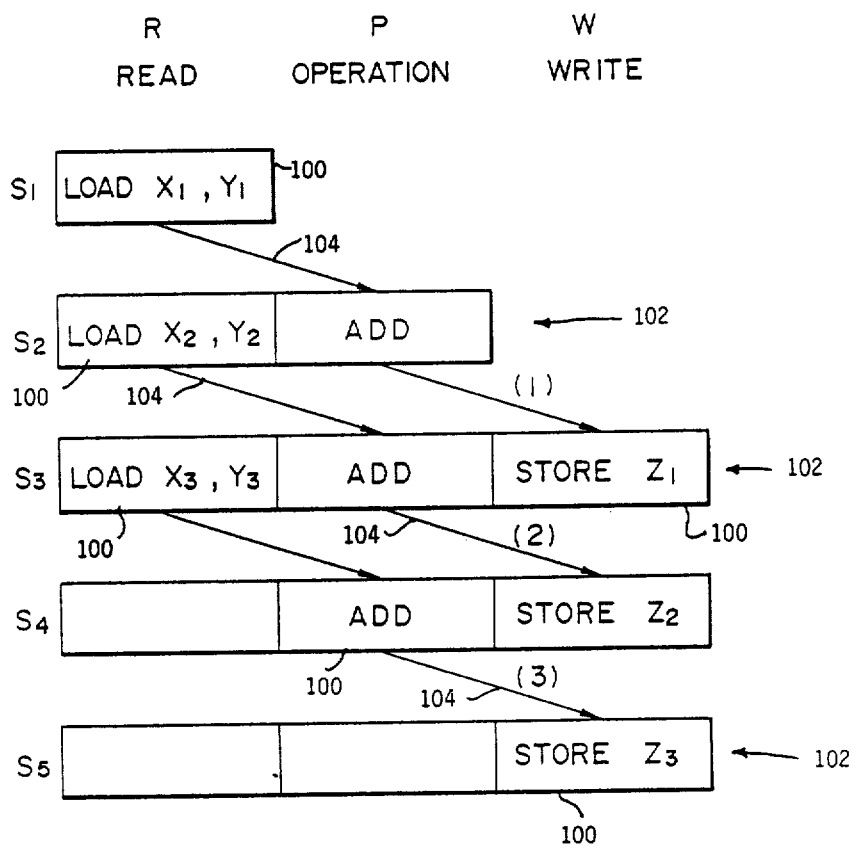
FIG. 3 shows the steps for executing addition instructions in the pipeline processor shown in FIG. 1.

Consecutive additions may be performed with successive execution of those microinstructions by effectively utilizing pipeline architecture, thereby enhancing the throughput of data processing of the digital signal processor. The pipeline processor may concurrently handle three streams of additions, in this example, such as $$X1 + Y1 \rightarrow Z1, \quad (1)$$

$$X2 + Y2 \rightarrow Z2, \text{ and} \quad (2)$$

$$X3 + Y3 \rightarrow Z3, \quad (3)$$

where the variables X1, X2, X3, Y1, Y2, Y3, Z1, Z2 and Z3 represent storage locations in the internal memory. Those three processings are consecutively performed as shown in FIG. 3. In the figure, a small box 100 represents a microoperation, such as load, addition or store. A plurality of small boxes 100 contiguous in the horizontal direction in the figure, or a single small box 100 alone, represent a set of instructions, which is referred to as a microinstruction 102. The lateral indications R, P and W denote read-out, an operation such as addition, and write-in, respectively. The processings denoted by those three lateral indications are executed at a single step of a microinstruction. The steps of microinstructions S1, S2, ..., S5 will be performed sequentially step by step. The executions of Expressions (1), (2), and (3) are designated by the corresponding arrows 104 in the figure.

Figure 4:
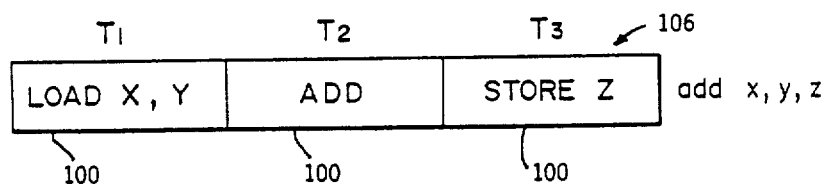
FIG. 4 shows an example of an assembler instruction applicable to the processor shown in FIG. 1.

In the illustrative embodiment, an assembler instruction such as addition, takes the format shown in FIG. 4.

In that example, the addition instruction 106 is represented by "add x, y, z". Boxes 100 in the figure represent microoperations, such as load, add or store. Those microoperations 100 in the add instruction 106 are executed in the three steps T1, T2 and T3. More specifically, in the first step T1, data is read out from storage locations X and Y of the internal memory, respectively. In the second step T2, the readout data are added in arithmetic and logical unit ALU. And in the third step T3, data resulting from the addition is written in memory location Z in the internal memory. The addition instruction 106 is described in a single format which defines addition of data in a memory in the digital signal processor and storing of the resultant data in the memory, resulting in executions of Expressions (1) (2) and (3).

The add instruction 106 shown in FIG. 4 has three operands X, Y and Z. The first and second operands X and Y of the addition instruction 106 specify storage locations X and Y from which data is to be read out, and correspond to an operand of the load instruction, which is the first microoperation 100 of the microinstruction 106 shown in FIG. 4. The third operand Z of the add instruction 106 defines storage location Z to which data is to be stored, and corresponds to an operand of the third microoperation, or store instruction 100. That structural feature of assembler instructions in the embodiment gives rise to an advantage in removing the necessity of the programmer understanding the internal structure of a pipeline processor as required in the conventional assembler instructions with mnemonic expressions.

Figure 5:
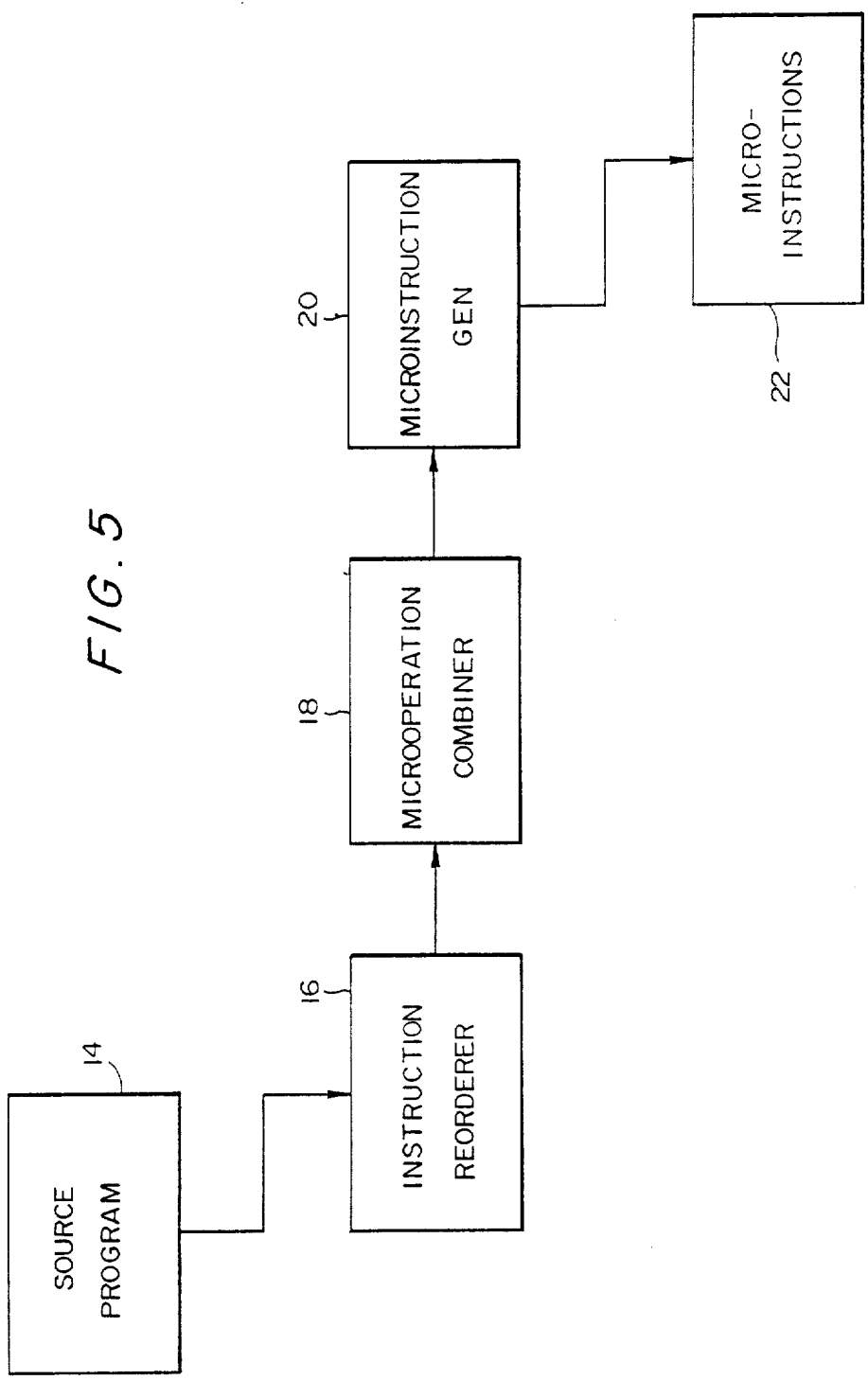
FIG. 5 shows an embodiment of a system for compiling a source program in accordance with the present invention.

Referring now to FIG. 5, a source program 14 for use advantageously in the digital signal processor is described with such assembler instructions. In the illustrative embodiment, source program 14 is read out into instruction reorderer 16, which in turn reorders the assembler instructions included in the source program. Microoperations defined by the assembler instructions are then combined sequentially by a microoperation combiner 18. Finally, from the microoperations thus combined, a microinstruction generator 20 produces microinstructions 22 as a target program associated with the input instructions included in source program 14. Those processings are shown in the form of a flow chart in FIG. 6.

The assembler instructions defining the microoperations will be complied by a couple of compiling means, instruction reorderer 16 and microoperation combiner 18, to be adapted for sets of instructions which are to be executed in the digital signal processor, in the present embodiment.

Figure 7:
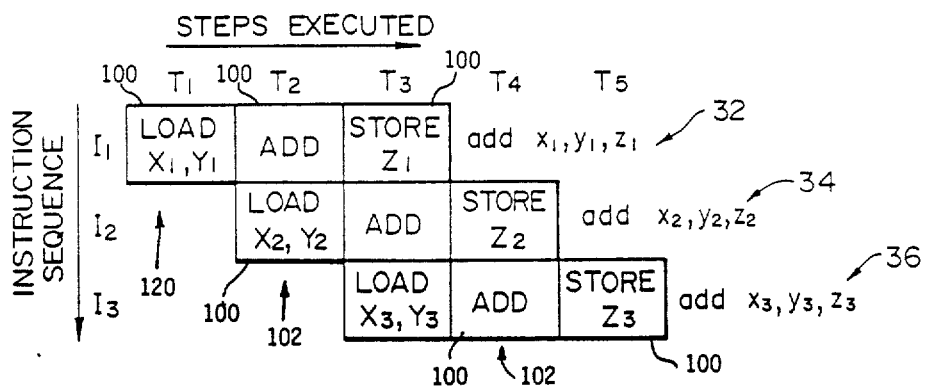
FIGS. 7, 8 and 9 illustrate examples of microoperations compiled by the embodiment shown in FIG. 5.

Referring now to FIG. 7, three specific assembler instructions, for example, add x1, y1, z1; add x2, y2, z2 and add x3, y3, z3, defined by the present embodiment are converted into microinstructions. In the figure, a small box 100 denotes and a single microoperation, a column of one or more small boxes 100 aligned in the vertical direction represents a single microinstruction. Those microinstructions 102 are sequentially executed in steps T1, T2, and so on. Vertical indications I1, I2 and I3 on the left in the figure denote the sequence of instructions.

Figure 6:
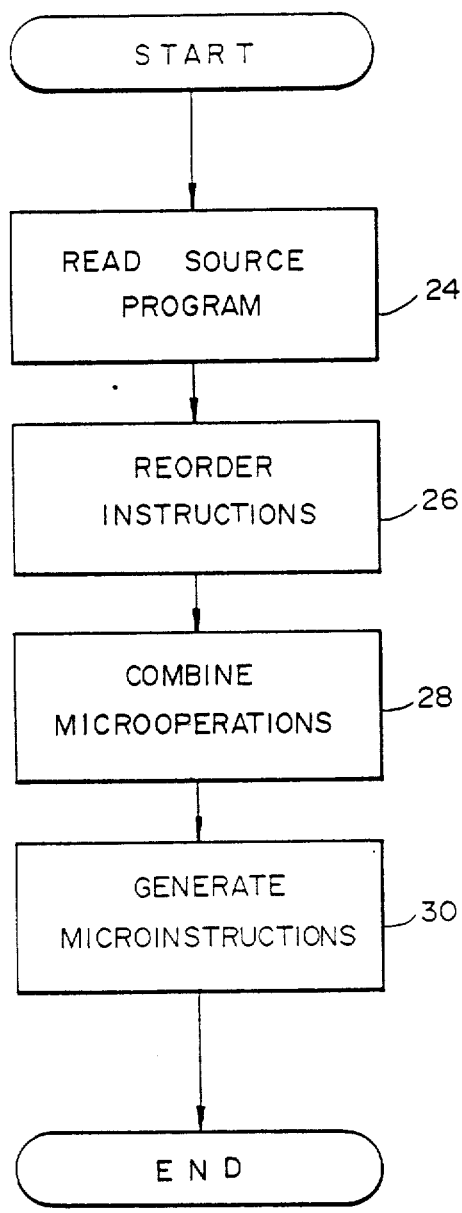
FIG. 6 is a flow chart useful for understanding the compiling flow performed in the embodiment shown in FIG. 5.

Source program 14 including assembler instructions is first read in instruction reordering, at step 24 in FIG. 6. Reordered instructions (step 26) are then combined on a microoperation basis at step 28 so as to conform with instruction sets to be executed in the digital signal processor. More specifically, at first, a set of instructions is extracted out of the microoperations which are arranged in the order to be executed by the assembler instructions, the extracted set of instructions, or a microinstruction 102, has fields defining microoperations 100 per se. Then, with respect to the thus extracted set of instructions, the microoperations 100 of assembler instructions following it are shifted in column so as not to cause competition or interference to occur in hardware resources or fields of microinstructions 102 against the microoperations 100 defined by the following assembler instructions.

In the example illustrated in FIG. 7, the first assembler instruction 32 is combined with the second assembler instruction 34 so as to be executed simultaneously in conformity with the format of instruction sets or microinstructions 102. The microoperations 100 involved in both of the assembler instructions take a different field in a set of instructions to be executed at the same time, i.e. in a single microinstruction 102. Accordingly, the microoperations 100 are re-combined so that the microoperations 100 defined by the second assembler instruction 34 are shifted by one step of execution with respect to the microoperations 100 defined by the first assembler instruction 32, as shown in FIG. 7. In other words, the microoperations 100 associated with the second assembler instruction 34 are to be executed following the corresponding one of the steps of microoperations 100 defined by the first assembler instruction 32. The results from such re-combination 28 performed by instruction combiner 18 are shown in FIG. 7.

As was discussed earlier, the combining of microinstructions (step 28) is accomplished after instruction reordering (step 26). The pipeline processor directed to digital signal processing executes the steps T1-T5 sequentially, each step consisting of a column of one or more microinstructions 102 aligned vertically in FIG. 7. Those executions perform substantially the same processings as described with reference to FIG. 3. The assembler instructions are thus compiled into the microinstructions 102 appropriately applicable to the pipeline-structured processor.

If an assembler instruction defines a reference to the value of a parameter which the immediately preceding assembler instruction defines, it will wait until the immediately preceding instruction completes its execution. In the illustrative embodiment, microoperation combining step 28 (FIG. 6) will shift the microoperations 100 defined by the assembler instruction which should follow the immediately preceding instruction, with the completeness of the data to be used in the following steps being taken into account. The recombination of microoperations 100 due to conflict of the data to be used may result in increasing unused fields of instruction sets, reducing the efficiency of performance of the pipeline processor.

Figure 8:
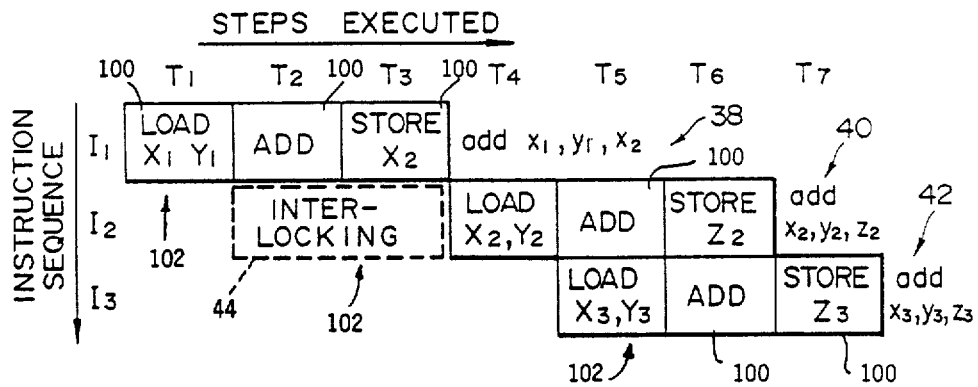

More particularly, with reference to FIG. 8, among the three assembler instructions 38 (add x1, y1, x2), 40 (add x2, y2, z2), and 42 (add x3, y3, z3), the second assembler instruction 40 is defined to refer to the value of variable or parameter x2, which is defined by the first assembler instruction 38. This requires that the second assembler instruction 40 be combined so as to be executed after the execution of the first assembler instruction 38 has been completed. That competition with regard to the hardware resources gives rise to interlocking relationship 44 between the pair of assembler instructions 38 and 40. In general, if there is an interlocking relationship such as 44 between two of the adjacent assembler instructions, then another assembler instruction, not pertinent to the pair of interlocked instructions, may intervene in between.

Figure 9:
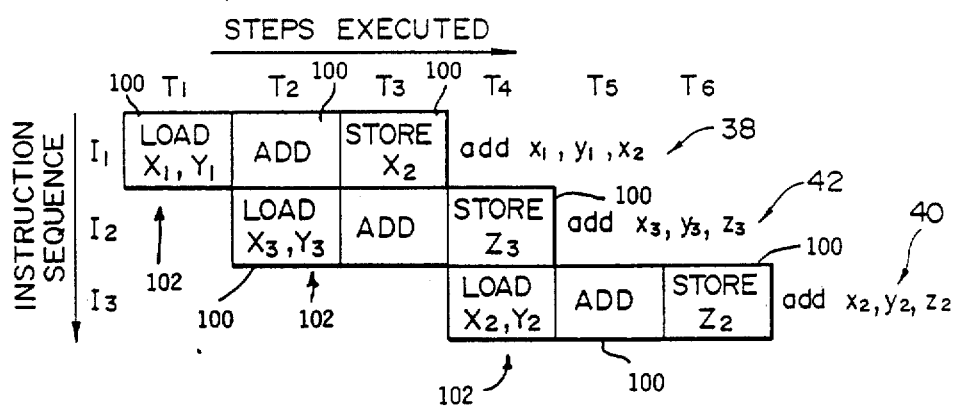

With the example shown in FIG. 8, the third assembler instruction 42 may intervene between assembler instructions 38 and 40, which are independent of the former. FIG. 9 shows the results from a compiling in which the third assembler instructions 42 is inserted betweent the first and second assembler instructions 38 and 40, and then the re-combination of miroopertions 100 is accomplished thereon.

From comparison of FIG. 9 with FIG. 8, it can easily be understood that the steps of the three assembler instructions 38, 42 and 40 to be executed are reduced by one, namely from T1-T7 to T1-T6. In the process of instruction reordering (step 26 in FIG. 6), an interlocking relationship, such as 44 in FIG. 8, is located among the assembler instructions included in a source program 14. If the presence of two assembler instructions which are interlocked with each other is detected another assembler instruction, independent of the interlocked instructions, is brought in thus reducing the steps to be executed.

An example in which specific addition instructions are executed by means of arithmetic and logical unit ALU has been described. Similarly, instruction reordering step 26 (FIG. 6) and microoperation combining step 28 can be performed on other types of operations defined by the assembler instructions in source program 14. For example, multiply and add instructions in source program 14 can also be compiled in a manner similar to what has been described above with respect to the add instructions. Microoperations 100 may be reordered and combined which include read-out from internal memory locations RAMX and RAMY (FIG. 1), multiplication by means of multiplier MPY, addition of data resultant therefrom to the contents of register ZR, and write-in to storage location RAMX.

In accordance with the illustrative embodiment, an assembler instruction system is defined in which microoperations 100 are employed in combination. This facilitates a source program to be described so as to reduce the time required for designing the program. In addition, the instruction reordering and microoperation combining processes are effected on a source program described in such a manner, thus enhancing the efficiency in performance of digital signal processing.

Figure 10:
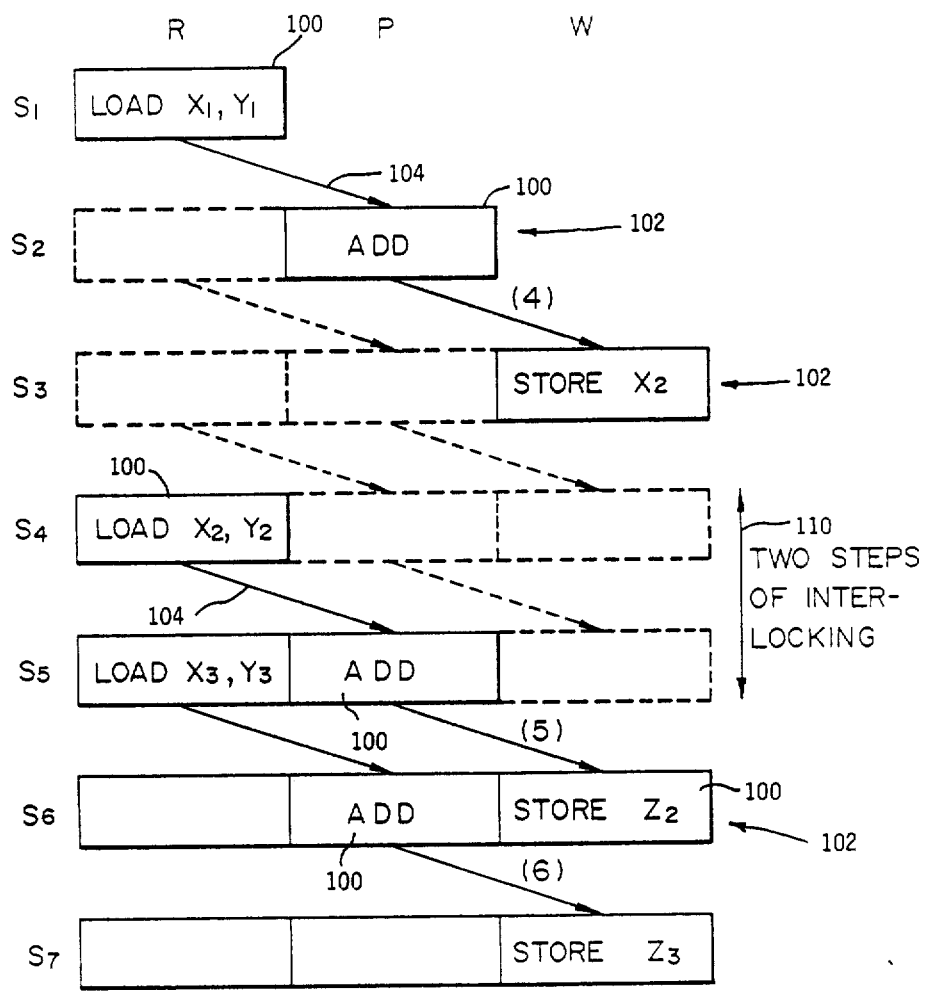
FIGS. 10, 11 and 12 show, similarly to FIG. 3, examples of the steps of addition instructions reordered to be executed in the pipeline processor shown in FIG. 1.

With reference to FIG. 10, the microoperation LOAD of the assembler instruction (5) commences after the completion of storing data of the immediately preceding assembler instruction (4), since the assembler instruction (5) has to refer to data which is defined by the instruction (4). In this example, the total number of steps to be executed increases to seven as compared to the example in FIG. 3 because of the presence of a two-step interlocking relationship 100 between the assembler instructions (4) and (5).

Figure 11:
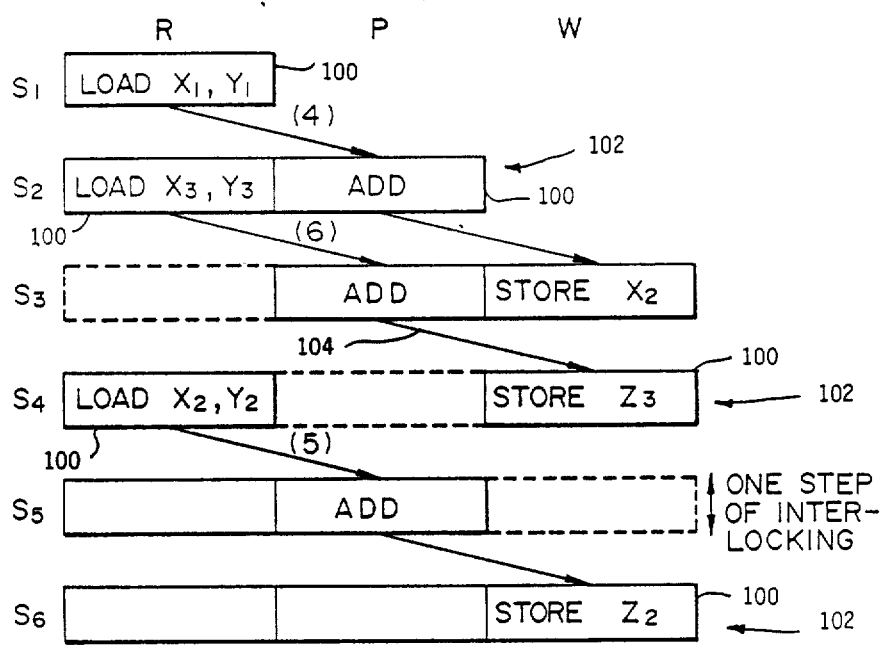

With the example shown in FIG. 10, among the three operational instructions (4), (5) and (6), the instruction (6) is independent with respect to the data involved in the remaining instructions (4) and (5). The operational instruction (6) may therefore be inserted between the other instructions (4) and (5), the resultant allocation of the steps of the instructions being shown in FIG. 11. The instruction reordering step 26 (FIG. 6) thus accomplished causes the interlocking relationship 110 to be reduced to one step, and also the total number of the instruction steps is reduced by ones, as will be understood from FIG. 11.

In summary, the instruction reordering is made on a sequence of assembler instructions involved in a basic block of a source program 14. The reordering process 26 first locates any pair of operational instructions which are interlocked with each other, and then allocates another operational instruction between the interlocked pair of instructions, resulting in a reduction of the steps to be executed in the basic block or group of instructions, and a reduction of the total steps to be executed in the entire target program.

Figure 12:
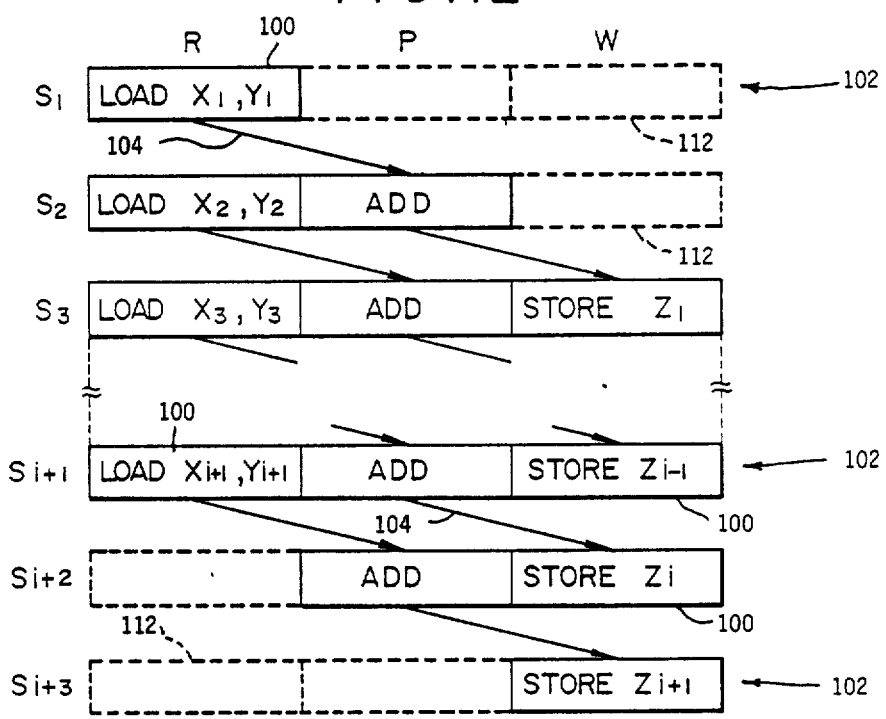

The above-described optimization permits vacant or idle fields to appear in the head and tail of the sequence of microcodes in a basic block since it deals with the basic block as a whole. As seen in FIG. 12, which shows an example of microcodes optimized in the above-discussed fashion, there are microoperation fields, depicted by phantom lines 112 in the figure, at the head and tail of the sequence which are not used by the microcodes. In addition, optimization by means of instruction reordering could not remove completely all interlocked portions, giving rise to residual unused fields mixed in the sequence of microcodes.

In addition, a loop of microoperations may often be involved in a program. The number of steps to be executed in a program, which includes a loop of operations, is substantially dependent upon the number of microcodes involved in the loop. In order to increase efficiency in running a target program, it is therefore advantageous to design or compile a program so as to reduce the microcodes included in the loop.

Figure 13:
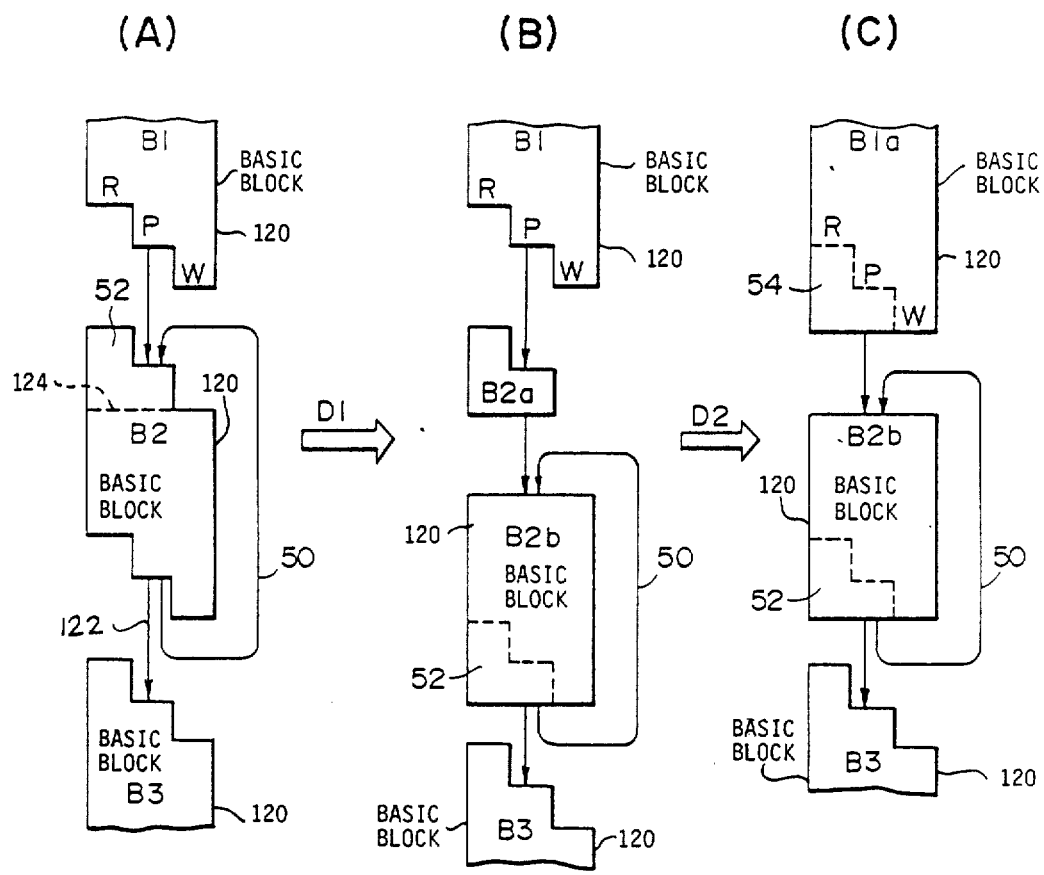
FIG. 13 shows an example of basic blocks re-combined in the optimizing procedures in accordance with the present invention.

Referring now to FIG. 13, which illustrates the concept of an alternative embodiment of the present invention, a portion of a source program 14 includes basic blocks B1, B2 and B3, which constitutes a basic group of instructions adapted to perform an intended processing function or task. In the figure, the contours of the basic blocks 120 represent the arrangement of microcodes forming the respective group of microoperations 100 defined, as depicted in FIG. 12, and the arrows 50 and 122 denote flows of control sequences. As noted from flow (A), basic block B2, which follows basic block B1, contains a loop of microcodes returning from the tail to the head of block B2 as denoted by the arrow 50 of control flow.

In FIG. 13, flow (A) is part of the input basic blocks of microcodes associated with source program 14. AFter processing D1 is performed on the input basic blocks, as shown by arrow D1, part of the basic blocks 120 is deformed as shown by flow (B) in the figure. More specifically, since basic block B2 contains control loop 50, processing D1 is performed on block B2 so as to reduce the steps included in that loop of microcodes. At first, processing D1 detaches head portion 52 of basic group B2, as depicted by the dotted line in flow (A), and then transfer portion 52 is transferred and confined to the tail of block B2 with the fields of instruction sets and the resources which the instructions use being prevented from competing with each other to form a new basic block B2*b* including that loop of microcodes 50, as shown in flow (B). Additionally, a set of microcodes B2*a* is newly generated which is an exact duplicate of the set of microcodes 52, transferred to the tail of basic group B2. The generated set of microcodes B2*a* is placed in front of the head of basic group B2*b*, as shown in FIG. 13(*b*). Those procedures are done in processing D1.

Next, processing D2 is performed on the basic blocks 120, shown in FIG. 13, so that that part is re-arranged into the state shown by flow (C). The subblock B2a, obtained in processing D1, is transferred and combined to the tail of the immediately preceding block B1, with the fields of the instruction sets and the resources being prevented from conflicting with each other. This establishes a new basic block B1a which includes a portion 54 corresponding to subblock B2a, as shown in flow (C).

Figure 14:
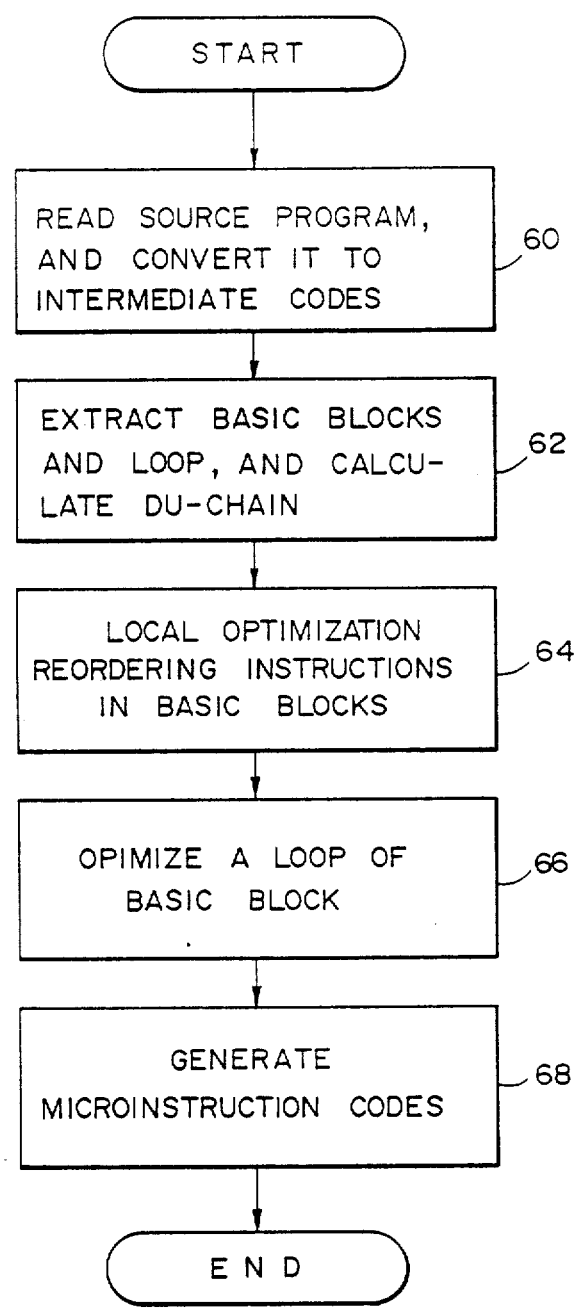
FIG. 14 is a flow chart showing the processes for accomplishing optimization in accordance with an alternative embodiment of the present invention.

As shown in the flow chart of FIG. 14, which illustrates an embodiment of the compiler system in accordance with the present invention, a source program 14 is read out and converted into a sequence of intermediate codes (step 60). The sequence of intermediate instruction codes is then divided into basic blocks, and if a loop of microcodes is present it is located as shown at step 62. In step 62, a Du-chain is calculated for the basic blocks 120. A Du-chain, or Definition-use chain, is a set of names which are alive immediately after a basic block and which are arranged with respect to the basic block. A Du-chain is defined from both a set of names, DEF [n], for which a value is substituted in a basic block n prior to using the value in the basic block n, and a set of names, USE [n], which are used in the block n before defined in that block n. Next, local optimization by instruction reordering is accomplished on the instruction sets of the respective basic blocks 120 in step 64, which is followed by another optimization step 66 performed on a block completing a loop thus located. From the thus optimized instructions of the basic blocks 120, corresponding microcodes are produced in step 68.

Figure 15:
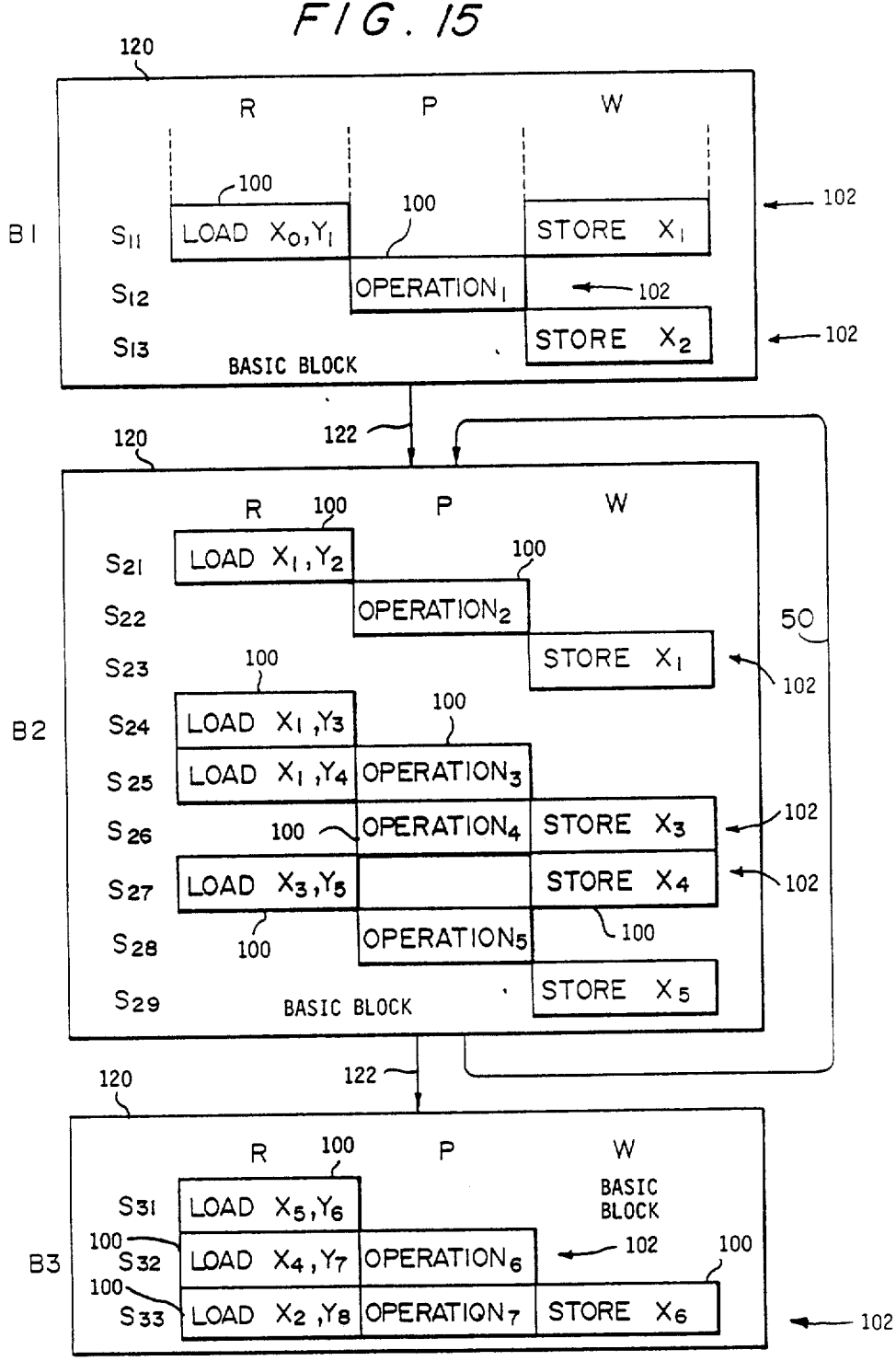
FIGS. 15, 16 and 17 show specific basic blocks of microcodes optimized in the procedures of the embodiment shown in FIG. 14.
Figure 16:
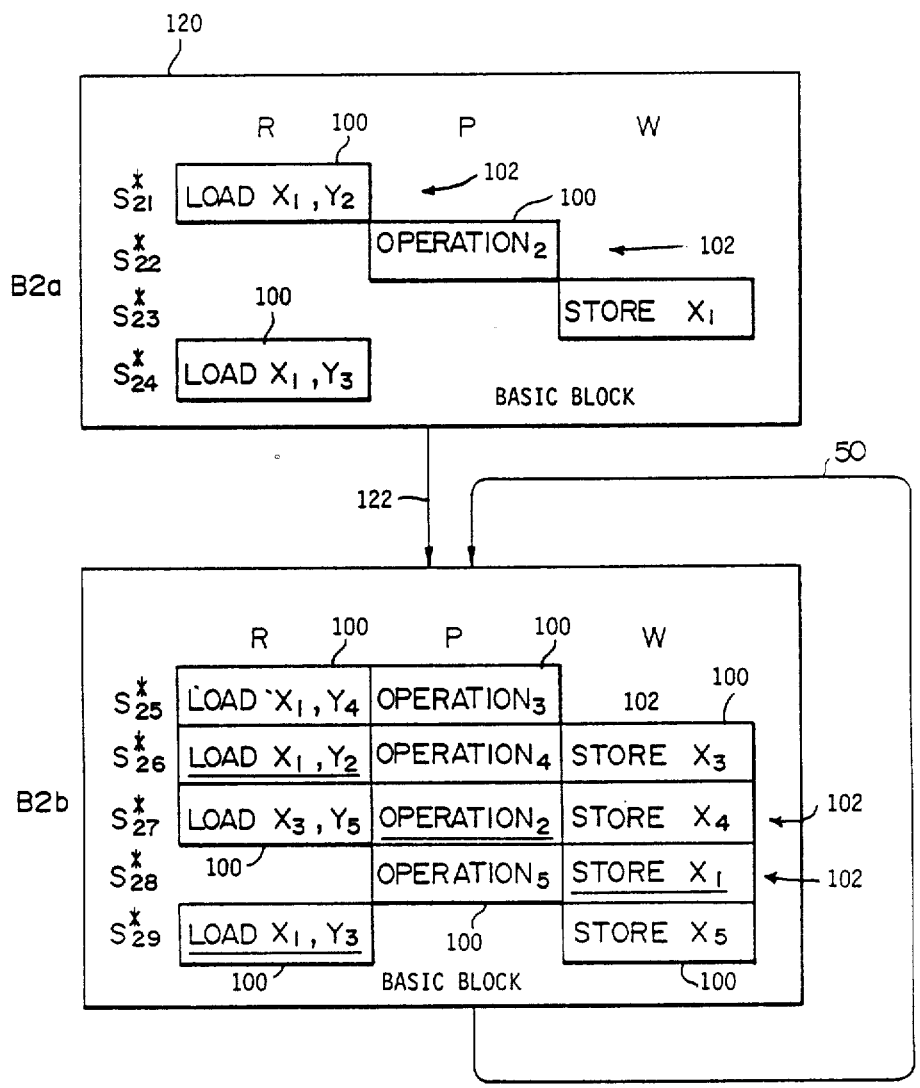
Figure 17:
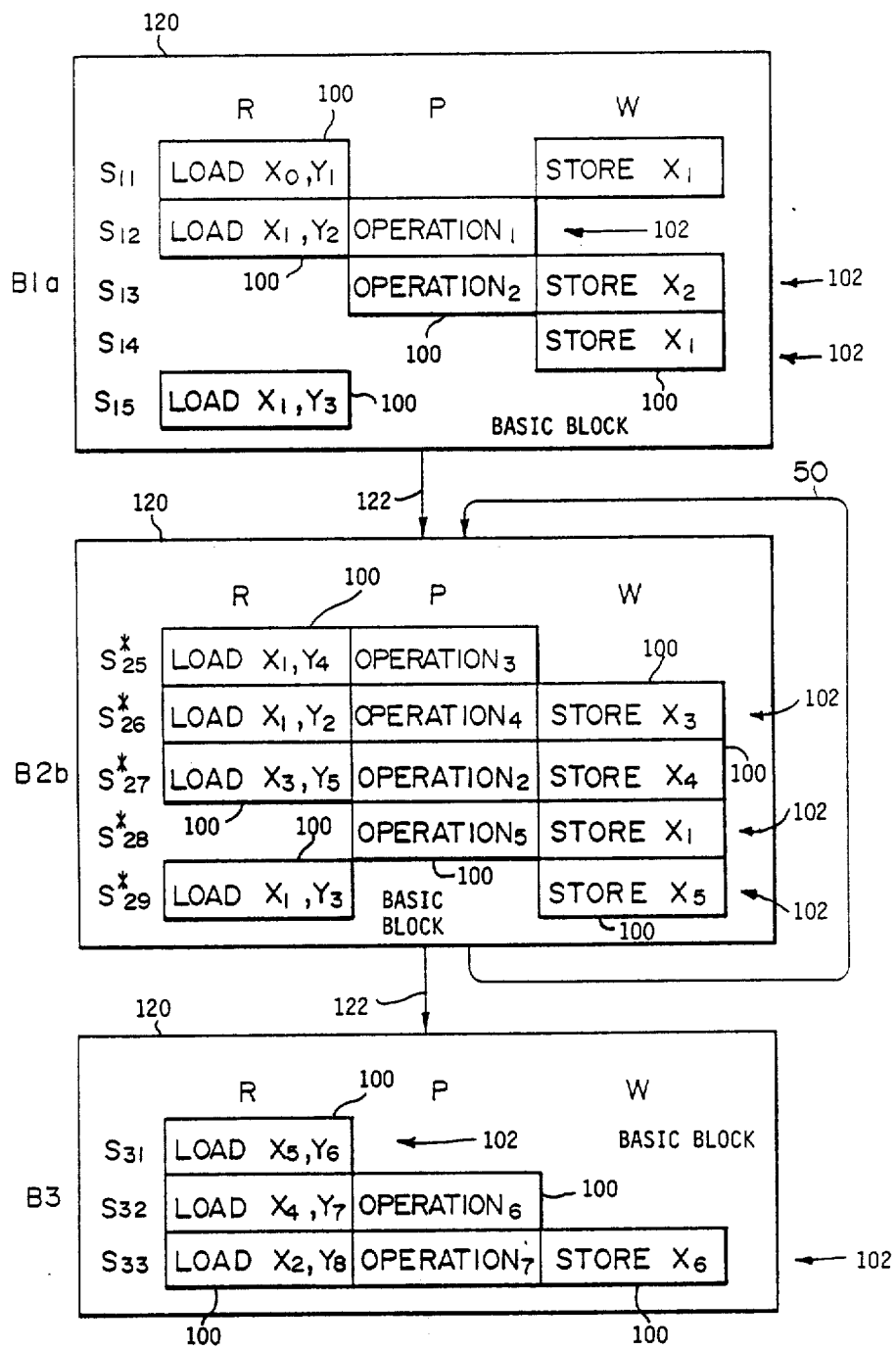

A more specific description will be presented, with reference to FIGS. 15, 16, and 17, of the procedures for minimizing the steps of microcodes in a basic block 120, forming such a control loop. Those figures illustrate basic blocks B1, B2 and B3 more particularly, in each of which the steps or microoperations of the microinstructions, such as S11, S12, are depicted in a fashion similar to FIG. 3.

First, sets of microcodes to be transferred, such as B2a in FIG. 13, are determined in the following manner. A review of the basic blocks in source program 14 during the compiling step 62 reveals that basic block B2 forms a loop including the control flow 50, indicated with the arrows 122 and 50 directed from the tail of block B2 to the head of the following basic block B3 and to the head of block B2. In step 62, a Du-chain is then calculated for all three of the basic blocks B1, B2 and B3. The Du-chain calculation produces, with respect to the respective basic blocks 120, a set of addresses which are alive in both head and tail of the basic block 120 in question to address the storage locations.

With the example shown in FIG. 15, live and dead states of the parameters, or addresses, X0–X6 in the head and tail of a basic block B- are expressed in the forms of IN[B-] and OUT[B-], respectively:

OUT[B1] = [0110000],

IN[B2] = [0110000],

OUT[B2] = [0110110], and

OUT[B3] = [0010110], where "1" and "0" represent live and dead addresses, respectively.

From the last expression in the above, it can be understood that the addresses which are referred to in basic block B3 are X2, X4 and X5. In basic block B2, therefore, no problem would occur even if addresses X1 and X3, which are defined by the names other than X2, X4 and X5, are defined more often than a predetermined number of recirculations over loop 50. It follows that among the sets of microcodes in basic block B2, there is appropriate microcode set which is both transferable to the tail of that block B2 and maximum in size is a portion of and this portion of block B2 starts at the top of the microcodes and ends immediately prior to the microcode having the microoperation 100 defining address X4. Namely, that portion contains the set of microcodes at S21 through S26.

The transferable set of microcodes at S21–S26 appears combinable with the tail of basic block B2, with conflict being avoided on the fields of the instruction sets and the resources. If the six microcodes S21–S26 were brought into combination with the rear end of the six microcodes at S24–S29, then a conflict could occur between two of the latter microcodes. In order to avoid the occurrence of such a conflict due to the transfer of microcodes, it is determined in optimization step 66 (FIG. 14) whether or not the fields of the instruction sets and the resources they use are matched between both groups of steps S21–S26 and S24–S29. Unless such a conflict occurs, then step 66 terminates. If a conflict is involved, the group of steps or microoperations subject to the transfer is reduced. More specifically, some of the steps of microcodes, which were destined to be transferred, are left off from the transfer. Such reduction in scale of the group of transferable steps is continued until a conflict does not occur.

Particularly with the example shown in FIG. 15, if the steps of microcodes S21, S22, S23 and S24 are combined with the steps of microcodes S26, S27, S28 and S29, respectively, no conflict will occur regarding the fields of the instruction sets and the resources available. Those combinations were successful to set up the new basic group B2b, (FIGS. 17 and 13).

The group of microcodes is thus finally set up in the above-mentioned process. Successful microcodes at S21–S24 are then copied to form a basic block B2a, (FIG. 13), which is in turn placed in front of the loop 50, in order to compensate for the transfer of those microcodes at S21–S24 to the tail of basic block B2.

With the example shown in FIG. 15, the above discussed two procedures, corresponding to process D1 of FIG. 13, are performed on basic block B2 having the loop 50, the resultant two basic blocks B2a and B2b being illustrated in FIG. 16. In the figure, basic block B2b includes a new set of microcrodes comprised of steps S*25–S*29, which result from combinations or superimpositions of the steps of microcodes at S21–S24 with S26–S29. As noted from FIG. 16, the underlined microcodes, such as LOAD X1, Y2, of basic block B2b, correspond to those coming from the steps of microcodes S21–S24 thus transferred. Basic block B2a contains the steps of microcodes S*21 through S*24 which are the copy of the steps of microcodes S21 through S24 which were included in original basic block B2, FIG. 15.

During the processing D2 of FIG. 13, the set of microcodes in basic group B2b (FIG. 16), newly generated, are coupled with the tail of the immediately preceding basic block B1 without being in conflict over the fields of the instruction sets and the resources available.

The procedure for avoiding such a conflict may be similar to that employed in the reduction of microcode steps in a basic block described above. The final state of basic blocks B1a, B2b and B3 resulting from the above described steps 64 and 66 performed on the part of source program 14 is shown in FIG. 17. Basic block B1a is generated from coupling of the microcodes of basic block B2a (FIG. 16) with the tail of the immediately preceding basic block B1 (FIG. 15), with conflict being avoided with respect to definition and reference of the fields and data of the instruction sets. Thereafter, step 68 of FIG. 14 is performed on the sets of microcodes in those new blocks so that appropriately optimized microcodes will be produced.

IF a program includes a loop, the steps required for executing the program substantially depend upon the number of the microcodes involved in that loop. In order to enhance the efficiency in performance of the program, it is advantageous to arrange the program so as to minimize the steps included in a loop. With the example of the basic group of instructions B2 (FIG. 15), which is not optimized in loop allocation, the number of the steps to be exectuted along loop 50 is $9M+6$, where M represents the number of repetitions along that loop. In the case of basic block B2b (FIG. 17), which is adequeately optimized, however, the execution steps are $5M+8$. Taking account of the dynamic steps of blocks B2 and B2b, execution efficiency becomes improved by 1.8 times, if M is considered infinite. A conventional optimization would, however, permit idle fields to be included in the head and tail of the basic block of microcodes.

Figure 18:
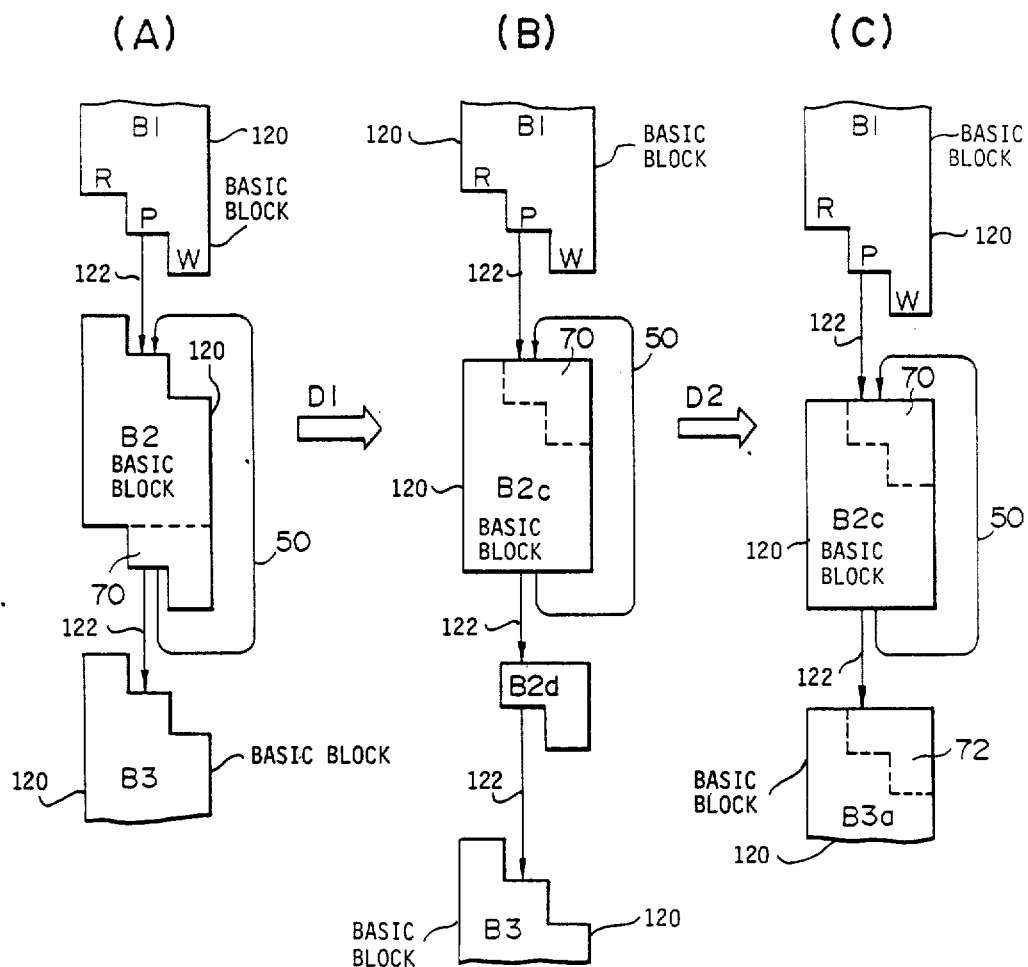
FIG. 18 shows, similarly to FIG. 13, another example of basic blocks re-combined in the optimizing procedures in accordance with the present invention.

In another alternative embodiment as shown in FIG. 18, rear part 70 of the microcode sets included in basic block B2 is extracted and moved to the head thereof to be coupled to form a new basic block B2a, thereby reducing the steps of microcodes in that basic block. Procedures for determining a portion of movable microcodes of the basic block and coupling or superimposing the transferable microcodes with the head of the block may be substantially the same as those described above with reference to FIGS. 13 and 15-17. As seen in FIG. 18, a set of microcodes B2d is derived from the set of microcodes 70 and is tranferred and combined to the top of the immediately following basic block B3 to form a portion 72 thereof.

In the illustrative embodiments, a basic block, having a loop, of a source program is so modified that a set of microcodes in the head or tail of the block is transferred and combined to the tail or head thereof, resulting in a reduction in the microcodes involved in that loop. This increases the efficiency in executing, in the pipeline signal processor, the target program compiled from the source program. Performance of those compiler processes on a program maximized in execution efficiency will allow loop sentences to be included often to reduce the program steps involved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of compiling a source program described with assembler instructions, each of which defines a plurality of microoperations, into a target program for use in a pipeline processor operative with microcodes forming a horizontal type of instructions defined by the microoperations, comprising the steps of:
   (a) reading the source program and generating intermediate codes representative of the assembler instructions;
   (b) identifying basic blocks of the intermediate codes of the assembler instructions and determining whether or not any basic block forms a loop, each basic block having a respective head portion and tail portion, and calculating a Du-chain for the basic blocks;
   (c) transferring either of the head and tail portions of a basic block forming a loop, if any, to the remaining one of the head and tail portions of the basic block forming the loop, the portion to be transferred being determined on the basis of a live parameter, included in the basic block immediately following the basic block forming the loop, resulting from the calculated Du-chain;
   (d) reordering microoperations of said source program by determining whether or not two of the assembler instructions are interlocked with each other, and placing another of the assembler instructions which is independent of the interlocked assembler instructions between the interlocked assembler instructions, if any; and
   (e) combining the microoperations reordered in said reordering step so as not to conflict with each other on fields of the assembler instructions and resources used by the assembler instructions.

2. A method in accordance with claim 1 further comprising the step of generating microinstructions including with the microoperations combined in said combining step to thereby produce the target program.

* * * * *